Oct. 1, 1957

E. J. FREY 2,808,210

MIXING VALVE

Filed May 5, 1953

INVENTOR.
Edward J. Frey
BY *R R Candor*
His Attorney

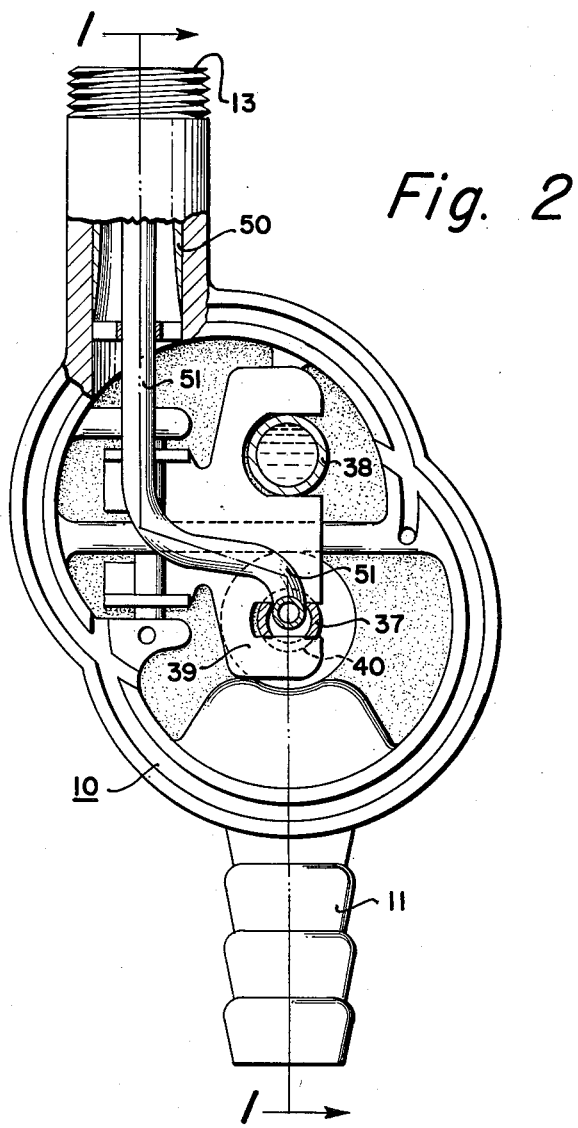
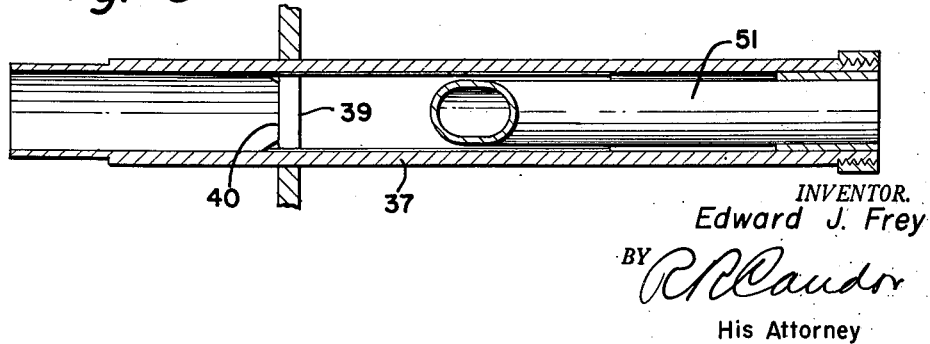

United States Patent Office 2,808,210
Patented Oct. 1, 1957

2,808,210

MIXING VALVE

Edward J. Frey, Dayton, Ohio, assignor to General Motors Corporation, Detroit, Mich., a corporation of Delaware Application May 5, 1953, Serial No. 353,063

7 Claims. (Cl. 236—12)

This invention relates to domestic appliances and more particularly to thermostatic mixers for washing machines or the like.

An object of this invention is to provide a structure having a pilot operated valve and provided with a tube connecting the pilot opening of the valve with a space having a fluid pressure lower than the normal outlet pressure of the structure.

Another object of this invention is to provide a structure of the character indicated in the preceding paragraph, in which a portion, at least, of the tube is flexible.

Another object of this invention is to provide a mixer having two fluid inlets and an outlet, with a fluid metering device for one of the inlets and a pilot operated valve for the other of the inlets, and with a fixed connection between the metering device and the pilot valve, and provided with a tube connecting the pilot opening of the valve with a space of relatively reduced fluid pressure.

Further objects and advantages of the present invention will be apparent from the following description, reference being had to the accompanying drawings wherein a preferred form of the invention is clearly shown.

In the drawings:

Figure 2 is a cross-section taken along the line 2—2 of Figure 1.

Figure 3 is a partial cross-section taken along the line 3—3 of Figure 1.

Figure 1:
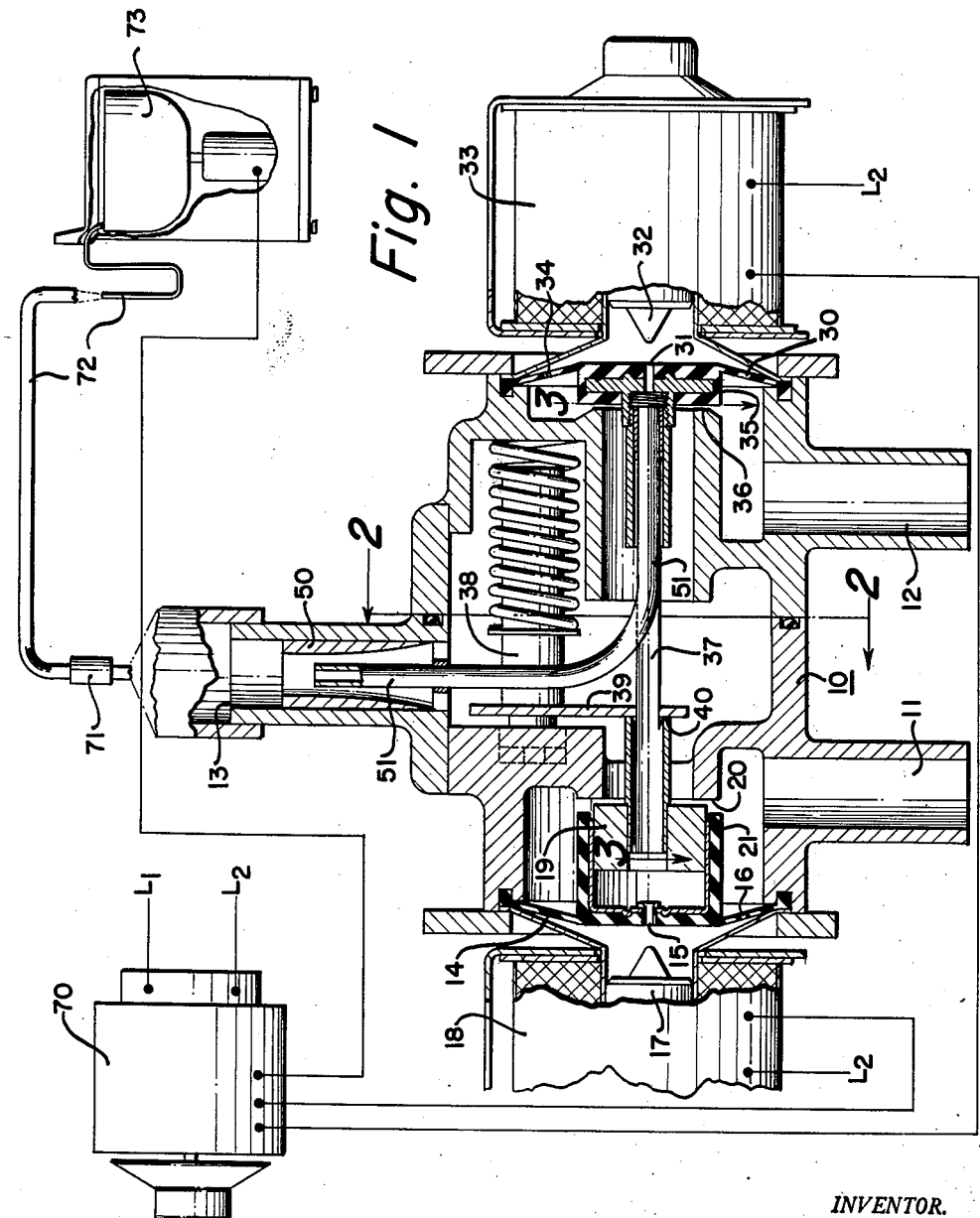
Figure 1 is a cross-section of the mixer, with the washing machine and timer shown diagrammatically.

The mixer or valve structure 10 is provided with a hot fluid inlet 11, a cold fluid inlet 12 and a fluid outlet 13. A hot fluid valve 14 preferably is pilot operated. It may be in the form of a diaphragm having a pilot opening 15 and a bleeder opening 16 of less capacity than the pilot opening 15. A spring pressed plunger 17 is operated by the solenoid 18 to open and close the pilot opening 15. A hot fluid metering device 19 is associated with the hot valve 14 and governs the volume of flow of hot fluid past the valve seat 20 by axial movement to and away from the valve seat. The diaphragm 14 has a tubular extension 21 which surrounds the metering device 19, and the extension 21 is itself adapted to move towards and away from the valve seat completely to close or open the main passageway at the valve seat 20. The position of extension 21 determines whether hot fluid flows or does not flow past valve seat 20, while the position of metering device 19 determines the volume of such flow.

A cold pilot operated fluid valve 30 is provided with a pilot opening 31 opened and closed by a solenoid plunger 32 operated by the solenoid 33. The diaphragm 30 is provided with a bleeder opening 34 of less capacity than the pilot opening 31. The diaphragm 30 is provided with a cap or extension 35 which moves to and away from the valve seat 36. The position of extension 35 not only determines whether cold fluid does or does not flow past valve seat 36, but also determines the volume of flow.

The diaphragm or valve 30 is fixedly connected to a rod, tube or other connection of fixed length 37 which is secured at its other end to the metering device 19. Any movement of the valve 30 is transmitted to the metering device 19 by the rod 37.

The rightward movement of the rod 37 is limited by the expansion and contraction of the thermostat 38 which in turn moves the hinge 39 to the right or left. The hinge forms an abutment for the shoulder 40 of the rod 37, and thus forms a rightward limiting stop for the rod. Any rightward pull of the valve 30 is stopped by the hinge 39 at the correct position, determined by the expansion and contraction of the thermostat 38. The position of thermostat 38 and its hinge 39 determines how far the cold valve 30 may open, and simultaneously determines the position of hot metering device 19, and so determines the proportions of hot and cold fluids to produce a mixture of proper temperature. Also, when the hot solenoid only is energized, the lost motion between the rod 37 and thermostat 38 and its hinge 39 allows metering device 19 to open completely and cold valve 30 to close completely, notwithstanding the heating action of the hot water on thermostat 38.

The parts so far described are more fully shown and described in my copending application for domestic appliance Serial No. 353,061, filed May 5, 1953, concurrently filed herewith and which matured into Patent 2,768,789, to which reference is made, if necessary, for further disclosure of such parts.

The valves 14 and 30 are moved axially by the varying and differential pressures on the sides of the valves, as is well known. In order to insure that the mixing device 19 is properly actuated, the pressure on the right-hand side of valve 30 is reduced below its otherwise normal pressure. This is accomplished by connecting the pilot opening 31 with a space having a fluid pressure lower than the normal outlet pressure. For example, a Venturi 50 is placed at the outlet 13, and a flexible tube 51 connects the pilot opening 31 with the throat of the Venturi where the pressure is lower than the normal outlet pressure. This low pressure is transmitted by the tube 51 to the right-hand side of the valve 30, and thus increases the differential pressure on the sides of valve 30 to provide an increased rightward pull on the rod 37. This overcomes any leftward pulling action of the metering device 19 and insures proper positioning of the metering device 19.

Figure 4:
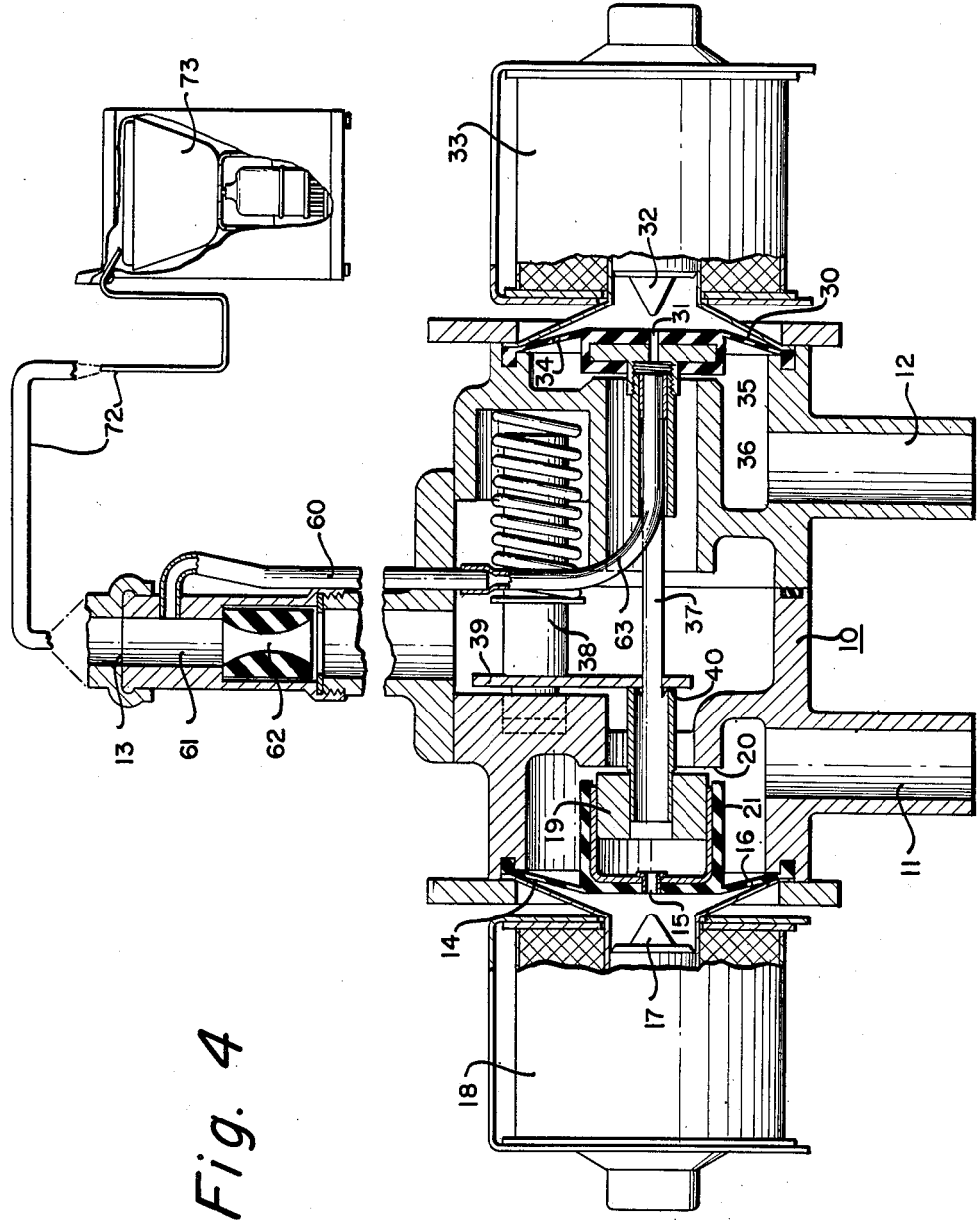
Figure 4 is a view similar to Figure 1, but showing a slightly modified view.

In Figure 4, the parts which correspond to those disclosed in Figure 1 have been similarly numbered, and operate in a similar manner. The tube connected with the pilot opening 31 is slightly different. Thus, the metal tube 60 is connected with the space 61 in the outlet 13 which is on the low side of the constant pressure reducer 62. The space 61 has a lower pressure than normal because of the passage of the fluid through the pressure reducer 62. The reducer 62 is adapted to provide a constant flow of fluid more or less independent of the varying pressures at the inlets 11 and 12 because of the contraction of the flexible throat, as is well known.

The metal tube 60 is connected with the pilot opening 31 by the flexible tube 63.

In the operation of the device shown in Figure 1, a timer 70 is set at the start position and initially energizes the timer motor and the hot fluid solenoid 18 to open pilot opening 15. This reduces the pressure on the left-hand side of valve 14 which then moves leftward to its extreme position and allows hot water to flow past the valve seat 20 to the outlet 13. At the same time, the valve 30 is in its extreme left position, and has pushed the meter 19 also to its extreme left position allowing a wide open passage for hot fluid past the valve seat 20. The thermostat 38 is heated by the hot water, and moves the hinge 39 to the right. However, such movement is not transmitted to the rod 37 or meter 19 because the hinge 39 merely moves away from the shoulder 40 of rod 37 without imparting any movement to it.

The flow of water continues past the flow controller 71 and through the pipe 72 to the tub 73 for a preselected period of time sufficient to fill the tub. Thereafter, the timer deenergizes solenoid 18, stopping the flow of water and also energizes the washing machine mechanism to agitate the clothes for the required length of time and thereafter spin the liquid out of the tub. Thereafter, the timer 70 energizes both solenoids 18 and 33 thus opening the pilot openings 15 and 31, fully opening valve 14 and opening valve 30 as far as the position of the thermostat 38 and hinge 39 will permit. Hot and cold waters flow through their respective inlets into the mixer and pass the thermostat 38, Venturi 50, pressure reducer 71, pipe 72 and tub 73 for the proper length of time to fill the tub. The thermostat 38 responds to the temperature of the mixed waters and expands to the proper position so that the hinge 39 maintains the metering device 19 and valve 30 at the proper positions to provide the correct relative flow of hot and cold water. The flow of mixed hot and cold water continues under the control of the timer until the tub is filled. The pressure of the water passing the Venturi 50 is reduced by the increased speed at this point, and this reduced pressure is transmitted by the tube 51 to the right-hand side of valve 30, which insures a positive pull to the right upon the rod 37.

After the tub is filled, the washing machine mechanism is properly energized to agitate the clothes for the proper length of time and thereafter spin out the liquid. If desired, another filling operation followed by agitation and spin may be repeated.

The operation in Figure 4 is the same, except that the pressure of the liquid in the outlet 13 has been reduced below the normal outlet pressure by the constant pressure metering device 62 instead of by the Venturi 50 as previously described. Otherwise, the operation of the device shown in Figure 4 is the same as in Figure 1.

Washing machines which may be supplied with water are disclosed in the Kendall Clark Patents 2,366,236, patented January 2, 1945, and 2,422,395, patented June 17, 1947. A timer which may be used is disclosed in the K. O. Sisson Patent 2,520,695, patented August 29, 1950.

In accordance with the provisions of Rule 78a, reference is made to my copending application S. N. 321,258, filed November 18, 1952, which has matured into Patent 2,747,801.

While the form of embodiment of the invention as herein disclosed constitutes a preferred form, it is to be understood that other forms might be adopted as may come within the scope of the claims which follow.

What is claimed is as follows:

1. A mixer having a first fluid inlet, a second fluid inlet, an outlet, a first fluid valve associated with said first fluid inlet for opening and closing said first fluid inlet, a pilot operated valve having a pilot opening controlled by a pilot associated with said second fluid inlet, a metering device associated with said first fluid inlet and operable to meter the flow at said first fluid inlet when said first fluid valve is in an open position, a connection of fixed length between said metering device and said pilot operated valve, means providing a space at said outlet having a pressure lower than normal outlet pressure, and a tube connecting said space with said pilot opening.

2. A mixer having a first fluid inlet, a second fluid inlet, an outlet, a first fluid valve associated with said first fluid inlet for opening and closing said first fluid inlet, a pilot operated valve having a pilot opening controlled by a pilot associated with said second fluid inlet, a metering device associated with said first fluid inlet and operable to meter the flow at said first fluid inlet when said first fluid valve is in an open position, a connection of fixed length between said metering device and said pilot operated valve, a thermostat responsive to fluid flowing to said outlet and actuating said connection, means providing a space at said outlet having a pressure lower than normal outlet pressure, and a tube connecting said space with said pilot opening.

3. A mixer having a first fluid inlet, a second fluid inlet, and an outlet, a first fluid valve associated with said first fluid inlet for opening and closing said first fluid inlet, a pilot operated valve having a pilot opening controlled by a pilot associated with said second fluid inlet, a metering device associated with said first fluid inlet and operable to meter the flow at said first inlet when said first fluid valve is in an open position, a connection of fixed length between said metering device and said pilot operated valve, a thermostat responsive to fluid flowing to said outlet and actuating said connection, a pressure reducing device associated with said outlet providing a space of reduced pressure, and a tube connecting said pilot opening with said space.

4. A fluid mixer having: a hot fluid inlet, a cold fluid inlet, a fluid outlet receiving fluid entering said inlets, a hot fluid pilot operated valve, a cold fluid pilot operated valve having a pilot, a pilot chamber and an annular seat with the inner portion discharging fluid to said fluid outlet and the outer portion receiving fluid from said cold fluid inlet, a closing diaphragm, a first side of which is movable against and away from said annular seat and the second side of which forms a wall of said pilot chamber, said diaphragm having a bleeder passageway opened and closed by said pilot; a hot fluid metering device between said hot fluid pilot operated valve and said fluid outlet; an actuating connection between said metering device and the diaphragm of said cold fluid pilot operated valve; and a Venturi construction through which flows fluid flowing through said fluid mixer, said Venturi construction having a fluid connection with said pilot chamber to aid in reducing the fluid pressure in said pilot chamber.

5. A fluid mixer having a first fluid inlet adapted to be connected with a hot fluid supply line, a first valve associated with said first fluid inlet for opening and closing the same, a second fluid inlet adapted to be connected with a cold fluid supply line, a fluid outlet, a pilot operated valve including a valve seat and a movable closing cap interposed between said second fluid inlet and said outlet for controlling flow therebetween, said closing cap being subjected to outlet pressure at one side thereof and to pilot chamber pressure at an opposite side thereof, a bleeder passageway in said closing cap connected with said pilot chamber, a pilot member adapted to open and close said passageway, a metering device associated with said first fluid inlet and operable to meter the flow at said first fluid inlet when said first fluid valve is in an open position, an actuating connection between said metering device and said first fluid valve, a thermostat responsive to fluid temperature actuating said connection, reducing means reducing the pressure on the discharge side of said outlet, and a connection between said reducing means and pilot chamber including a flexible conduit.

6. A fluid mixer having a first fluid inlet adapted to be connected with a hot fluid supply line, a first valve associated with said first fluid inlet for opening and closing the same, a second fluid inlet adapted to be connected with a cold fluid supply line, a fluid outlet, a pilot operated valve including a valve seat and a movable closing cap interposed between said second fluid inlet and said outlet for controlling flow therebetween, said closing cap being subjected to outlet pressure at one side thereof and to pilot chamber pressure at an opposite side thereof, a bleeder passageway in said closing cap connected with said pilot chamber, a pilot member adapted to open and close said passageway, a metering device associated with said first fluid inlet and operable to meter the flow at said first fluid inlet when said first fluid valve is in an open position, an actuating connection between said metering device and said first fluid valve, a thermostat responsive to fluid temperature actuating said connection, a Venturi construction in said fluid outlet, and a connection between said Venturi and said bleeder passageway including a flexible conduit.

7. A fluid mixer having a first fluid inlet adapted to be connected with a hot fluid supply line, a first valve associated with said first fluid inlet for opening and closing the same, a second fluid inlet adapted to be connected with a cold fluid supply line, a fluid outlet, a pilot operated valve including a valve seat and a movable closing cap interposed between said second fluid inlet and said outlet for controlling flow therebetween, said closing cap being subjected to outlet pressure at one side thereof and to pilot chamber pressure at an opposite side thereof, a bleeder passageway in said closing cap connected with said pilot chamber, a pilot member adapted to open and close said passageway, a metering device associated with said first fluid inlet and operable to meter the flow at said first fluid inlet when said first fluid valve is in an open position, an actuating connection between said metering device and said first fluid valve, reducing means reducing the pressure on the discharge side of said outlet, and a fluid connection between said reducing means and said bleeder passageway.

References Cited in the file of this patent

UNITED STATES PATENTS

| | | |
|---|---|---|
| 1,939,970 | Fuess et al. | Dec. 19, 1933 |
| 2,250,815 | Ruegg et al. | July 29, 1941 |
| 2,251,441 | Dillman | Aug. 5, 1941 |
| 2,449,766 | Brown | Sept. 21, 1948 |
| 2,466,485 | Schultz | Apr. 5, 1949 |
| 2,483,426 | Moore | Oct. 4, 1949 |
| 2,503,901 | Chace | Apr. 11, 1950 |
| 2,519,381 | Kreske | Aug. 22, 1950 |
| 2,610,795 | Streeter | Sept. 16, 1952 |
| 2,655,316 | Edwards | Oct. 13, 1953 |
| 2,705,608 | Phillips | Apr. 5, 1955 |

FOREIGN PATENTS

| | | |
|---|---|---|
| 467,435 | Canada | Aug. 15, 1950 |